Oct. 6, 1931.   A. H. ROSEN   1,826,365
CORN THINNER
Filed Nov. 28, 1930   2 Sheets-Sheet 1
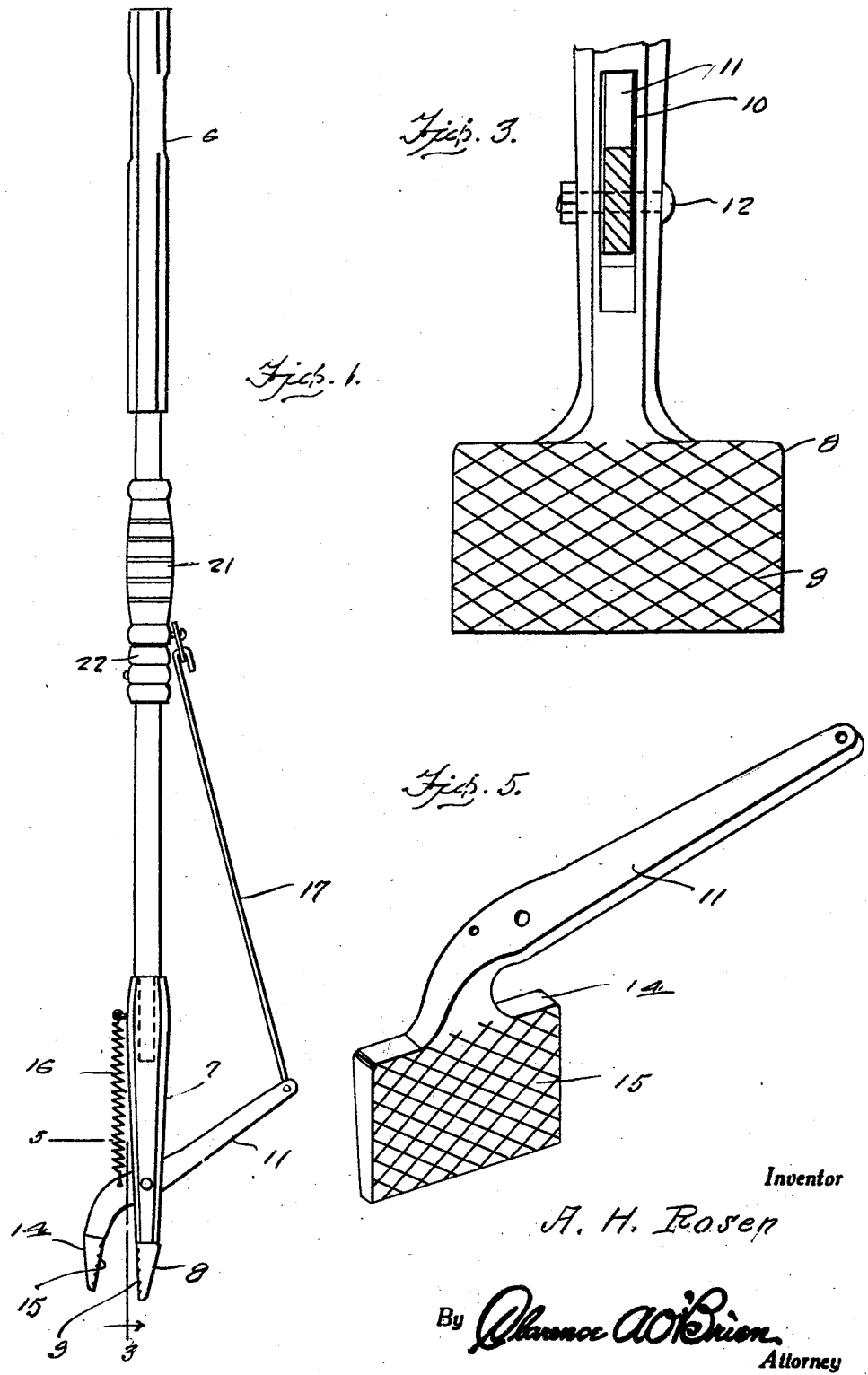
Inventor
A. H. Rosen
By Clarence A. O'Brien
Attorney Oct. 6, 1931.  A. H. ROSEN  1,826,365
CORN THINNER
Filed Nov. 28, 1930   2 Sheets-Sheet 2
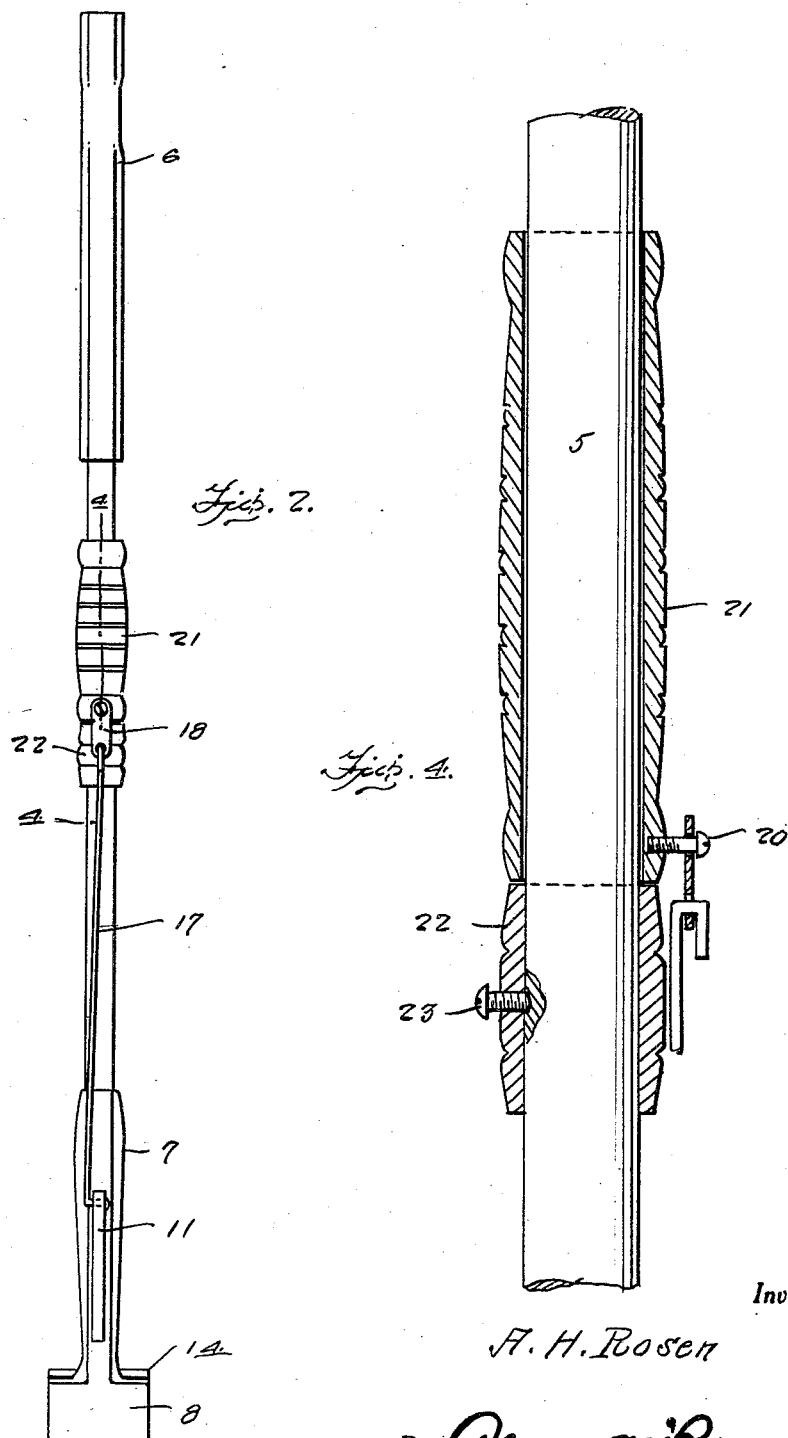
Inventor
A. H. Rosen
By Clarence A. O'Brien
Attorney Patented Oct. 6, 1931

1,826,365

UNITED STATES PATENT OFFICE

ALFRED H. ROSEN, OF ALCOMA, VIRGINIA

CORN THINNER

Application filed November 28, 1930. Serial No. 498,795.

The present invention relates to a device for thinning corn, pulling weeds and other like operations and has for its prime object to provide a device of this nature which is exceedingly simple in construction, inexpensive to manufacture, easy to manipulate, thoroughly efficient and reliable in use and operation and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawings:

Figure 1 is a side elevation of the device embodying the features of my invention, Figure 2 is a similar view taken at right angles to that shown in Figure 1.

Figure 3 is a sectional view taken substantially on the line 3—3 of Figure 1.

Figure 4 is a sectional view taken substantially on the line 4—4 of Figure 2, and Figure 5 is a perspective view of the movable jaw.

Referring to the drawings in detail it will be seen that the numeral 5 denotes an elongated handle with a grip 6 at the upper end thereof. On the lower end of the handle is a shank 7 the upper end of which is hollowed out to receive the lower end of the handle. On the lower end of the shank 7 there is formed a jaw plate 8 one face of which is serrated as at 9. Intermediate the ends of the shank 7 there is formed a slot 10. A shank 11 has an intermediate portion thereof pivotally mounted by means of a bolt 12 in the slot 10. On one end of the shank 11 is a jaw plate 14 having a face serrated as at 15 opposed to the face 9. A spring 16 is engaged with the shank 11 and the shank 7 normally holding the jaw plates 8 and 14 in spaced relation as is shown in Figure 1. A link 17 is engaged with the shank 11 and with a plate 18. The plate 18 is engaged with a screw 20 projecting from the lower end of a sleeve 21 slidable on the handle 5 between the grip 6 and a stop collar 22 held on the handle 5 in suitable adjusted position by means of a set screw 23. It will be apparent that by pulling upwardly on the sleeve 21 the plate 18 and link 17 are actuated so as to swing the shank 11 and move the jaw plate 14 toward the jaw plate 8 so that a stalk of corn or the like may be gripped between the two jaw plates for pulling purposes.

It is thought that the construction, operation, utility and advantages of this invention will now be quite apparent to those skilled in this art without a more detailed description thereof.

The present embodiment of the invention has been described in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention or sacrificing any of its advantages.

Having thus described my invention, what I claim as new is:

A plant puller comprising an elongated handle, a shank having a socket at one end for receiving the lower end of the handle, and a jaw forming plate at its other end, said shank having an elongated slot therein, a second shank passing through the slot pivoted therein and having one end curving downwardly, a jaw forming plate connected with said curved end, a spring connected with the curved part and with the upper part of the first shank normally holding the jaws apart, a collar adjustably arranged on the handle, the upper end of the handle having an enlarged part forming a hand grasp, a sleeve slidably arranged on the handle and located between the collar and the lower end of the enlargement, a pin on the lower end of the sleeve, a plate having a hole therein for receiving the pin and a link pivotally connected to the plate and to the second shank at that end of the second shank which is opposite the jaw carrying part.

In testimony whereof I affix my signature.

ALFRED H. ROSEN.